US009277099B2

(12) United States Patent
Kajiwara et al.

(10) Patent No.: US 9,277,099 B2
(45) Date of Patent: Mar. 1, 2016

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Yuto Kajiwara, Kawasaki (JP); Hiroyuki Sakai, Chigasaki (JP); Tetsuya Suwa, Yokohama (JP); Akitoshi Yamada, Yokohama (JP); Kentaro Yano, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/579,863

(22) Filed: Dec. 22, 2014

(65) Prior Publication Data
US 2015/0181083 A1 Jun. 25, 2015

(30) Foreign Application Priority Data

Dec. 24, 2013 (JP) ................................. 2013-265236

(51) Int. Cl.
*H04N 1/60* (2006.01)
*H04N 1/41* (2006.01)
*H04N 1/405* (2006.01)
*G06K 15/02* (2006.01)

(52) U.S. Cl.
CPC .......... *H04N 1/6027* (2013.01); *G06K 15/1881* (2013.01); *H04N 1/4052* (2013.01)

(58) Field of Classification Search
None
See application file for complete search history.

(56) References Cited

U.S. PATENT DOCUMENTS

| | | | | |
|---|---|---|---|---|
| 5,333,212 A * | 7/1994 | Ligtenberg | ........... | H04N 19/172 375/240.01 |
| 6,122,403 A * | 9/2000 | Rhoads | ............. | G06F 17/30876 382/233 |
| 6,181,822 B1 * | 1/2001 | Miller | .................. | H04N 11/046 375/E7.265 |
| 6,748,116 B1 * | 6/2004 | Yue | .......................... | G06T 9/004 382/238 |
| 7,177,478 B2 * | 2/2007 | Ville | ........................ | H04N 1/41 358/426.13 |
| 7,302,107 B2 * | 11/2007 | Ahmed | ..................... | H04N 1/41 358/426.14 |
| 7,889,920 B2 * | 2/2011 | Arakawa | .............. | H04N 19/186 382/166 |
| 2005/0084171 A1 * | 4/2005 | Lapstun | ................. | B41J 2/0452 382/245 |
| 2005/0152606 A1 * | 7/2005 | Wood | .................. | G06K 9/00067 382/232 |
| 2009/0021791 A1 * | 1/2009 | Ebner | .................. | H04N 1/4105 358/3.06 |
| 2010/0027882 A1 * | 2/2010 | Matsuoka | .............. | H04N 1/642 382/166 |
| 2010/0329548 A1 * | 12/2010 | Yoshimura | ..................... | 382/164 |
| 2011/0255777 A1 * | 10/2011 | Matsuoka | .......... | H04N 1/40062 382/164 |
| 2014/0016141 A1 * | 1/2014 | Yamada et al. | ................. | 358/1.2 |
| 2014/0132429 A1 * | 5/2014 | Scoville | .................. | H03M 7/30 341/87 |
| 2014/0218753 A1 * | 8/2014 | Murasawa et al. | ............. | 358/1.2 |
| 2015/0002902 A1 * | 1/2015 | Akiba et al. | ................... | 358/2.1 |
| 2015/0022863 A1 * | 1/2015 | Fujita et al. | .................. | 358/3.24 |
| 2015/0181082 A1 * | 6/2015 | Sakai | .................... | H04N 1/6027 358/3.05 |

FOREIGN PATENT DOCUMENTS

JP 4053460 B2 2/2008

* cited by examiner

*Primary Examiner* — Madelein Nguyen

(74) *Attorney, Agent, or Firm* — Canon USA, Inc. IP Division

(57) ABSTRACT

Information corresponding to the degree of compression of lossy-compressed image data to be printed is acquired. Furthermore, based on the acquired information, a providing method of a recording agent when the image data to be printed is expanded and an image based on the expanded image data is printed, is determined.

20 Claims, 19 Drawing Sheets

PAPER FEEDING DIRECTION

FIG. 4

| (R, G, B) | DEVICE RGB (R, G, B) |
|---|---|
| (0, 0, 0) | (0, 0, 0) |
| (0, 0, 16) | (0, 0, 10) |
| (0, 0, 32) | (0, 3, 28) |
| ⋮ | ⋮ |
| ⋮ | ⋮ |
| (255, 255, 240) | (248, 255, 230) |
| (255, 255, 255) | (255, 255, 255) |

| (R, G, B) | (C, M, Y, K) |
|---|---|
| (0, 0, 0) | (0, 0, 0, 255) |
| (0, 0, 16) | (18, 16, 0, 246) |
| (0, 0, 32) | (33, 31, 0, 224) |
| ⋮ | ⋮ |
| ⋮ | ⋮ |
| (255, 255, 240) | (0, 0, 15, 0) |
| (255, 255, 255) | (0, 0, 0, 0) |

TARGET PIXEL L

| | TH | 7/16 |
|---|---|---|
| 1/16 | 5/16 | 3/16 |

SCANNING DIRECTION

FIG. 9

| GRADATION DATA | AMOUNT OF INK | NUMBER OF DOTS | |
|---|---|---|---|
| 1 (RECORD) | 10 pl | 2 | |
| 0 (NON-RECORD) | 0 pl | 0 | |

| 8 | 6 | 5 | 8 | 12 | 20 | 26 | 30 |
|---|---|---|---|---|---|---|---|
| 6 | 6 | 7 | 10 | 13 | 29 | 30 | 28 |
| 7 | 7 | 8 | 12 | 20 | 29 | 35 | 28 |
| 7 | 9 | 11 | 15 | 26 | 44 | 40 | 31 |
| 9 | 11 | 19 | 28 | 34 | 55 | 52 | 39 |
| 12 | 18 | 28 | 32 | 41 | 52 | 57 | 46 |
| 25 | 32 | 39 | 44 | 52 | 61 | 60 | 51 |
| 36 | 46 | 48 | 49 | 56 | 50 | 52 | 50 |

| 4 | 3 | 2 | 4 | 6 | 10 | 13 | 15 |
|---|---|---|---|---|---|---|---|
| 3 | 3 | 3 | 5 | 6 | 14 | 15 | 14 |
| 3 | 3 | 4 | 6 | 10 | 14 | 17 | 14 |
| 3 | 4 | 5 | 7 | 13 | 22 | 20 | 15 |
| 4 | 5 | 9 | 14 | 17 | 27 | 26 | 19 |
| 6 | 9 | 14 | 16 | 20 | 26 | 28 | 23 |
| 12 | 16 | 19 | 22 | 26 | 30 | 30 | 25 |
| 18 | 23 | 24 | 24 | 28 | 25 | 26 | 25 |

| 2 | 1 | 1 | 2 | 3 | 5 | 6 | 7 |
|---|---|---|---|---|---|---|---|
| 1 | 1 | 1 | 2 | 3 | 7 | 7 | 7 |
| 1 | 1 | 2 | 3 | 5 | 7 | 8 | 7 |
| 1 | 2 | 2 | 3 | 6 | 11 | 10 | 7 |
| 2 | 2 | 4 | 7 | 8 | 13 | 13 | 9 |
| 3 | 4 | 7 | 8 | 10 | 13 | 14 | 11 |
| 6 | 8 | 9 | 11 | 13 | 15 | 15 | 12 |
| 9 | 11 | 12 | 12 | 14 | 12 | 13 | 12 |

FIG. 12A

| GRADATION DATA | AMOUNT OF INK | NUMBER OF DOTS | |
|---|---|---|---|
| 1 (RECORD) | 10 pl | 2 | |
| 0 (NON-RECORD) | 0 pl | 0 | |

FIG. 12B

| GRADATION DATA | AMOUNT OF INK | NUMBER OF DOTS | |
|---|---|---|---|
| 1 (RECORD) | 5 pl | 4 | |
| 0 (NON-RECORD) | 0 pl | 0 | |

FIG. 16A

| GRADATION DATA | AMOUNT OF INK | NUMBER OF DOTS | |
|---|---|---|---|
| 1 (RECORD) | 10 pl | 2 | |
| 0 (NON-RECORD) | 0 pl | 0 | |

FIG. 16B

| GRADATION DATA | AMOUNT OF INK | NUMBER OF DOTS | |
|---|---|---|---|
| 2 (RECORD) | 10 pl | 2 | |
| 1 (RECORD) | 10 pl | 1 | |
| 0 (NON-RECORD) | 0 pl | 0 | |

FIG. 20A

| (R, G, B) | (C, M, Y, K) |
|---|---|
| (0, 0, 0) | (0, 0, 0, 255) |
| (0, 0, 16) | (18, 16, 0, 246) |
| (0, 0, 32) | (33, 31, 0, 224) |
| ⋮ | ⋮ |
| ⋮ | ⋮ |
| (255, 255, 240) | (0, 0, 15, 0) |
| (255, 255, 255) | (0, 0, 0, 0) |

FIG. 20B

| (R, G, B) | (C, M, Y, K, Lc, Lm) |
|---|---|
| (0, 0, 0) | (0, 0, 0, 255, 0, 0) |
| (0, 0, 16) | (18, 16, 0, 246, 0, 0) |
| (0, 0, 32) | (28, 25, 0, 224, 16, 12) |
| ⋮ | ⋮ |
| ⋮ | ⋮ |
| (255, 255, 240) | (0, 0, 15, 0, 0, 0) |
| (255, 255, 255) | (0, 0, 0, 0, 0, 0) |

INFORMATION PROCESSING APPARATUS, INFORMATION PROCESSING METHOD, AND STORAGE MEDIUM

BACKGROUND

1. Field of the Disclosure

The present disclosure relates to an information processing apparatus, an information processing method, and a storage medium for determining a providing method of a recording agent for printing an image based image data which has been compressed in a lossy compression method.

2. Description of the Related Art

A printing apparatus that performs printing of images may perform printing of an image based on image data which has been compressed in a lossy-compression method. A Joint Photographic Expert Group (JPEG) method is an example of such a lossy-compression method. Image data compressed in this JPEG method is expanded, and an image based on the expanded image data is printed on a recording medium by a printing apparatus.

As described above, the JPEG method is a lossy compression method. Therefore, image degradation called mosquito noise may occur in an expanded image. This mosquito noise arises from quantization processing in JPEG compression. In the JPEG method, by quantization processing for an image which has been converted into a spatial frequency by discrete cosine transform (DCT) processing, in particular, information of high-frequency components is eliminated. Accordingly, when expansion processing is performed, for example, a signal value which does not originally exist around edges within the expanded image may be generated as the above-mentioned mosquito noise.

In Japanese Patent No. 4053460, high contrast gradation processing is performed for image data obtained by decompressing an image which has been compressed in a JPEG format. In the processing, block distortion is suppressed, and processed image data with high image quality is obtained.

In Japanese Patent No. 4053460, processing for eliminating mosquito noise against image data obtained by expanding compressed image data, is suggested. More specifically, image data obtained by expanding compressed image data is divided into units of blocks, noise determination processing is performed, and the type of noise and the degree of occurrence of noise are determined. Then, switching parameters (a quantization threshold value, an error determination threshold value, and a diffusion factor) in half tone processing for creating printing data, based on the noise determination result, is described in Japanese Patent No. 4053460.

In Japanese Patent No. 4053460, a determination is made based on an image that has been subjected to expansion processing. Therefore, it may be impossible to distinguish whether a portion determined to be noise is generated by lossy compression and expansion or is included in the original image before compression and expansion. As a result, for example, even if the degree of compression in the lossy compression method is small and noise is less likely to occur, a portion included in the original image may be falsely determined to be noise and the portion may be eliminated from the image.

SUMMARY

The present disclosure provides an information processing apparatus, an information processing method, and a storage medium capable of appropriately determining, based on information corresponding to the degree of compression of lossy-compressed image data to be printed, a providing method of a recording agent.

Further features of the present invention will become apparent from the following description of exemplary embodiments with reference to the attached drawings.

BRIEF DESCRIPTION OF THE DRAWINGS

FIG. 4 illustrates an example of a color correction table.

FIG. 9 is a diagram illustrating an example of the amount of ink and the number of ink ejection times corresponding to one dot of data determined by an ejection amount conversion portion.

FIGS. 10A, 10B, and 10C are diagrams illustrating examples of a quantization table stored in advance in a printing apparatus.

FIGS. 12A and 12B are diagrams each illustrating the amount of ink ejection per dot and the number of dots per pixel corresponding to a Q factor.

FIGS. 16A and 16B are diagrams each illustrating the amount of ink per dot and the number of dots per pixel corresponding to gradation data.

FIGS. 20A and 20B are diagrams illustrating a color separation table corresponding to a Q factor.

DESCRIPTION OF THE EMBODIMENTS

Hereinafter, embodiments of the present invention will be described. The embodiments described below are merely examples. The present invention is not limited to the embodiments described below.

Explanation of Hardware Configuration

Figure 1:
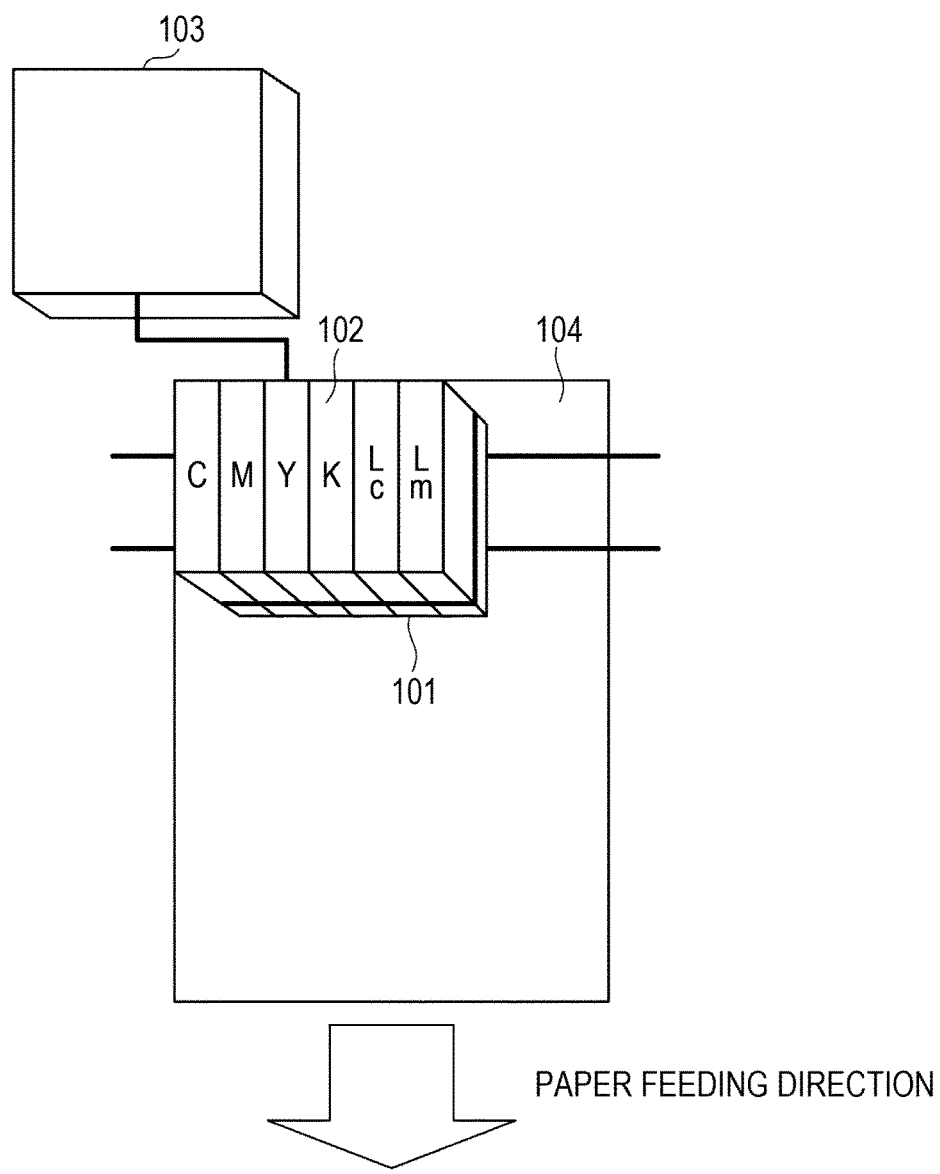
FIG. 1 is a diagram illustrating an example of an ink jet recording apparatus according to an embodiment.

FIG. 1 is a diagram illustrating an example of an ink jet recording apparatus, which is an example of a printing apparatus according to an embodiment. An ink tank 102 filled with ink is mounted on a recording head 101. In the example of FIG. 1, as an example of the ink tank 102, six ink tanks filled with ink of six colors: C (cyan), M (magenta), Y (yellow), K (black), Lc (light cyan), and Lm (light magenta), are illustrated. Lc and Lm represent ink for expressing colors lighter than C and M, respectively. The above ink tanks are merely examples and the number of colors is not necessarily six. An ink tank of any color may be installed. Ink tanks filled with ink of the same color of different materials, such as dyes and pigments, may be installed.

A control circuit portion 103 includes a storage part, an arithmetic operation part, and a communication part for driving the recording head 101. The recording head 101 receives a recording signal indicating whether or not ink ejection is necessary and a control signal indicating the timing of the ejection, and ejects ink based on the recording signal in accordance with the control signal. A recording medium 104, which is a recording medium, is supplied with ink ejected from the recording head 101 while being conveyed through a conveyance roller, which is not illustrated. Accordingly, an image is recorded on the recording medium 104.

In this embodiment, an ink jet method will be explained as an example of a recording method for use in a printing apparatus. However, a printing apparatus which performs printing by supplying toner by an electrophotographic method is also applicable.

Furthermore, a recording method in which ink is supplied while a carriage on which the recording head 101 and the ink tank 102 are mounted is performing scanning in a direction orthogonal to the conveyance direction of the recording medium 104, is illustrated in FIG. 1. However, a printing apparatus does not necessarily have the configuration described above. A printing apparatus may include a line head having a length equal to or longer than the length in the width direction of the recording medium 104 and perform printing without performing the scanning mentioned above.

Figure 2:
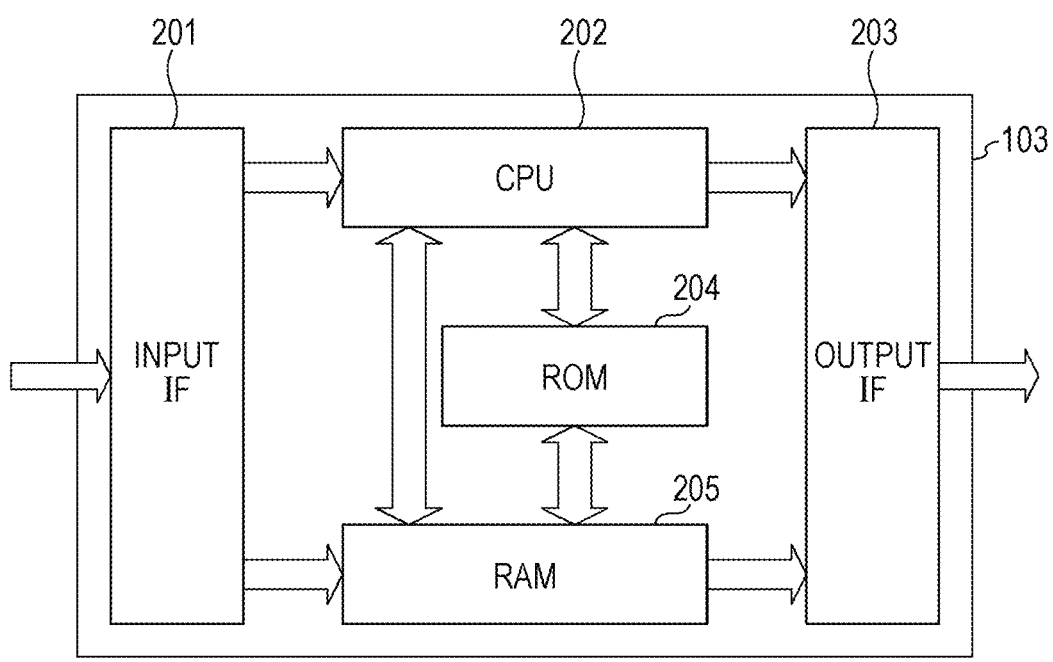
FIG. 2 is a block diagram illustrating a configuration of a control circuit portion.

FIG. 2 is a block diagram illustrating a configuration of the control circuit portion 103. The control circuit portion 103 includes an input interface 201, a central processing unit (CPU) 202, an output interface 203, a read-only memory (ROM) 204, and a random access memory (RAM) 205. The ROM 204 is a nonvolatile memory. A control program for controlling the control circuit portion 103 and the entire printing apparatus is stored in the ROM 204. The RAM 205 is a memory for storing the control program stored in the ROM 204 and various data including image data and various parameters.

The CPU 202 controls the control circuit portion 103 and the entire printing apparatus by reading the control program stored in the ROM 204, which is a nonvolatile memory, onto the RAM 205 and executing the control program on the RAM 205. More specifically, the CPU 202 receives a user instruction from an operation portion, an external computer, a smartphone, a tablet, and the like, which are not illustrated, and performs control in accordance with the instruction. That is, the CPU 202 operates as an example of an information processing apparatus according to an embodiment.

The input interface 201 receives input of image data to be recorded and a control signal for driving the recording head, from an external or internal memory, an external computer, and the like, which are not illustrated. The input interface 201 transmits the image data and the control signal to the RAM 205 and the CPU 202. At this time, the CPU 202 converts the image data into a recording signal for ink ejection by executing, on the RAM 205, the control program stored in the ROM 204. The thus converted recording signal is output from the output interface 203 as recording data, along with the control signal. The recording head 101 is driven by the output recording data and control signal, and an image is recorded on the recording medium 104.

For example, when image data compressed in the JPEG method is input through the input interface 201, the CPU 202 performs JPEG expansion processing for the image data, and converts the expanded image data into a recording signal.

Although the CPU 202 performs JPEG expansion processing and conversion processing into a recording signal in the example of FIG. 2, the present invention is not limited to this. More specifically, a hardware circuit which performs the JPEG expansion processing and/or conversion processing may be provided separately from the control circuit portion 103, and the hardware circuit may perform the JPEG expansion processing and/or conversion processing.

In this embodiment, image data which has been compressed in the JPEG method, which is the lossy compression method, is input to the input interface 201, and the CPU 202 performs expansion processing for the image data and conversion processing into a recording signal. In the compression in the JPEG method, due to compression and expansion, information which does not exist in the original image before compression may be generated as mosquito noise. In particular, the visibility of characters in a document image which mainly contains characters may be degraded by mosquito noise generated around a character portion. For example, in the case where a document image in which mosquito noise has been generated is printed by an ink jet printing apparatus, occurrence of ink bleeding may reduce, in particular, the legibility of small characters.

Based on information corresponding to the degree of compression of image data which has been compressed in the lossy compression method, various parameters to be used for printing of an image based on the image data are determined. More specifically, based on the above information, the amount of ink in one ink ejection operation by the recording head 101, the number of ink dots per pixel, and the color of ink to be ejected are determined. The determination is performed so that in the case where the degree of compression is high and noise is more likely to occur in an expanded image, the amount of ink in one ink ejection operation is small, the number of dots of ink per pixel is small, and the color of ink is light. Accordingly, a situation in which when an image based on image data which has been compressed at a high degree of compression in the lossy compression method is printed, noise is enhanced in a printing result, can be prevented.

In this embodiment, an example in which acquisition of lossy-compressed image data, expansion processing for the lossy-compressed image data, creation of printing data by gradation conversion, and the like are performed in a printing apparatus is explained. For example, in the case where the above processing is performed by a printer driver in a host apparatus which is connected to a printing apparatus, the printer driver needs to be installed in the individual host apparatuses. Therefore, in the case where various devices, such as a personal computer (PC), a smartphone, and a tablet, cause a printing apparatus to perform printing through various interfaces, the printer driver needs to be installed in all these devices. Furthermore, since a printer driver may be provided for each type of a printing apparatus, in the case where a host apparatus causes printing apparatuses of different types to perform printing, a printer driver needs to be installed for each of the apparatus type.

In this embodiment, acquisition of lossy-compressed image data, expansion processing for the lossy-compressed image data, creation of printing data by gradation conversion, and the like are performed in a printing apparatus. Therefore, a host apparatus is able to cause a printing apparatus to perform printing by transmitting image data which has not been converted into printing data, even without processing by a printer driver. Furthermore, image data on which compression processing has been performed can be transmitted. Therefore, compared to the case where expanded data is transmitted, data to be printed can be transmitted to the printing apparatus more rapidly.

Block Diagram of Firmware

Figure 3:
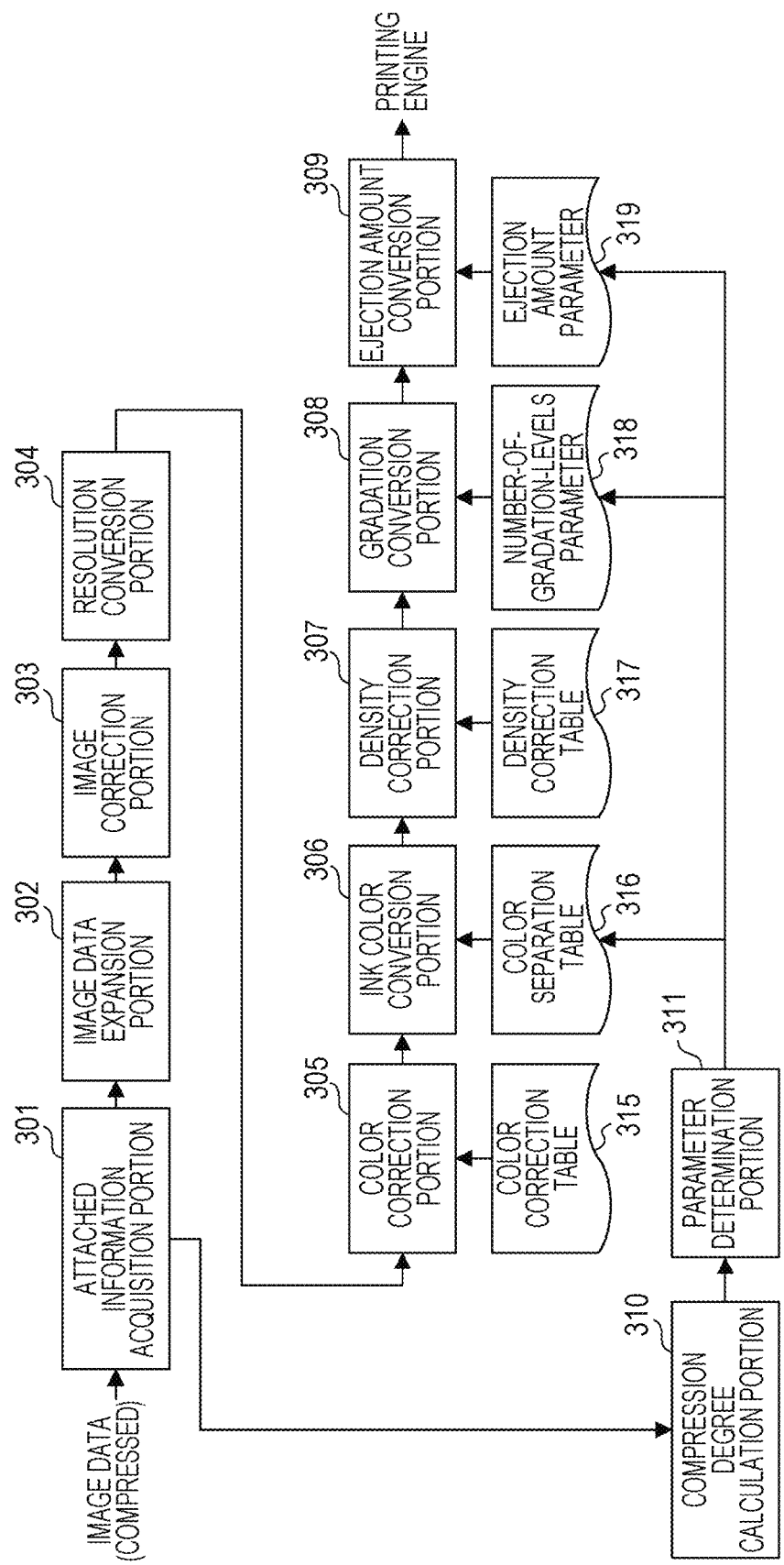
FIG. 3 illustrates an example of a block diagram of a firmware configuration according to an embodiment.

FIG. 3 illustrates an example of a block diagram of a firmware configuration according to an embodiment. Functions of the individual blocks illustrated in FIG. 3 are stored as program modules of the control program in the ROM 204, and the functions of the individual blocks in FIG. 3 are implemented when the CPU 202 executes these modules. A hardware circuit for performing part or all of these blocks may be provided separately. By allowing the circuit to implement all the functions or to implement part of the functions and cooperate with the CPU 202, the functions explained with reference to FIG. 3 may be implemented.

Processing illustrated in FIG. 3 is performed on image data input to the input interface 201 to convert the image data into a recording signal of a resolution and the number of gradation levels that can be received by a printing engine, which is not illustrated, connected to the recording head, and the recording signal is output to the printing engine. Hereinafter, the details will be described. Explanation of individual processing units An attached information acquisition portion 301 acquires various parameters used when image data was compressed. These parameters include information for identifying the compression ratio of the image data. For example, in the case where a JPEG file of JPEG-compressed image data is input, the JPEG file contains a quantization table and image data size used when JPEG compression was performed. By using such information, a quantization factor (Q factor) for identifying the number of quantization steps can be obtained. The attached information acquisition portion 301 acquires the quantization table (Q table) and the image data size (the number of vertical pixels and the number of horizontal pixels). The Q table is a quantization table used when quantization processing was performed on an image compressed in the JPEG method. By obtaining a Q factor from the Q table, the degree of compression of the image compressed in the JPEG method can be obtained. The details will be described later.

Furthermore, the various parameters acquired by the attached information acquisition portion 301 are transmitted to an image data expansion portion 302 to be used for processing for expanding the compressed image data. The various parameters are also transmitted to a compression degree calculation portion 310 to be used for processing for calculating the degree of compression at the time when the image data was compressed.

The image data expansion portion 302 is a processing portion which decodes encoded image data to extract image data. In the case where the input image data is compressed, the image data expansion portion 302 performs expansion of the image data by performing expansion processing corresponding to the compression method of the image data. The processing performed by the image data expansion portion 302 will be described with reference to FIG. 8B.

Image signal values RGB obtained by the image data expansion portion 302 are transmitted to an image correction portion 303.

The image correction portion 303 performs image correction of the RGB data. Image correction may include, for example, lightness adjustment for brightening or darkening the entire color, contrast adjustment, color balance adjustment, and backlight correction and red-eye correction in photography printing. By performing the above corrections for this block in a unitary manner, processing which does not depend on a recording apparatus can be achieved. The image on which correction has been performed as described above by the image correction portion 303 is transmitted to a resolution conversion portion 304.

The resolution conversion portion 304 converts an image into a resolution corresponding to a printing apparatus. A necessary scaling amount is derived from input image data and the resolution of the printing apparatus, and enlarging or reducing processing is performed. Scaling processing includes, for example, a nearest neighbor method, a bilinear method, and a bicubic method. The above processing is appropriately selected taking into consideration the characteristics of the processing, the processing speed, a printing mode set in the corresponding printing. The image on which resolution conversion has been performed as described above is transmitted to a color correction portion 305.

The color correction portion 305 performs color conversion processing for output from the printing apparatus. For example, in the case where an image displayed on a display device is recorded, the color reproduction range is not always the same between display and printing. For example, a certain color has a narrower reproduction range for the printing apparatus, and a different color has a narrower reproduction range for the display device. There is a need to minimize such image degradation and perform color compression and expansion in an appropriate manner.

In this embodiment, the color correction portion 305 performs the above processing in an RGB method. That is, RGB values input to the block are converted into RGB values for the printing apparatus (hereinafter, for distinction, referred to as Device RGB) by taking the reproductivity of the device into consideration. Conversion may be performed through calculation of a matrix and the like. In this embodiment, however, a three-dimensional color correction table 315 is used.

In the case where RGB values each having 8 bits (256 gradation levels) are input, when all the combinations are maintained, the data volume of data representing the combinations is large. Therefore, the color correction table 315, in which thinning is performed at specific intervals, is used.

FIG. 4 illustrates an example of a color correction table.

In the example of FIG. 4, the color correction table describes Device RGB values corresponding to 17 grid points, which represent 256 gradation levels of each color (17·17·17=4913 grid points).

A value between grid points is calculated using interpolation processing. In this embodiment, a process using tetrahedral interpolation is described as an interpolation method. The tetrahedral interpolation method is linear interpolation in which a three-dimensional space is divided into units of tetrahedrons and four grid points are used.

Figure 5A:
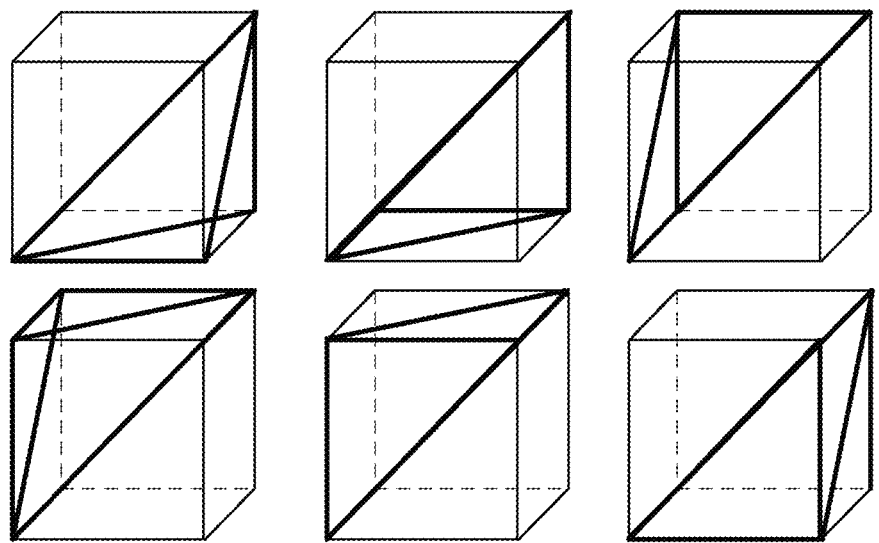
FIGS. 5A and 5B are diagrams for explaining a tetrahedral interpolation method.
Figure 5B:
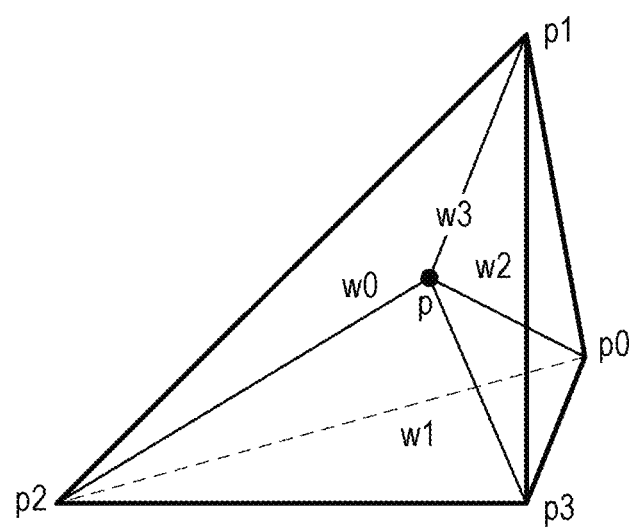

FIGS. 5A and 5B are diagrams for explaining a tetrahedral interpolation method. First, division into tetrahedrons is performed, using Equation 2, as illustrated in FIG. 5A. Then, it is determined to which one of the divided tetrahedrons a target point p belongs. The four vertices of the tetrahedron are represented by p0, p1, p2, and p3, and the tetrahedron is further divided into small tetrahedrons, as illustrated in FIG. 5B. In the case where conversion values of the individual points are represented by f(p0), f(p1), f(p2), and f(p3), an interpolation value f(p) is obtained using Equation 2.

$$f(p) = \sum_{i=0}^{3} wi \times f(pi) = [w0, w1, w2, w3]\begin{bmatrix} f(p0) \\ f(p1) \\ f(p2) \\ f(p3) \end{bmatrix}$$  Equation 2

In Equation 2, w0, w1, w2, and w3 represent the volume rate of small tetrahedrons at anti-counter positions with respect to the individual vertices pi to the entire tetrahedron p0p1p2p3. The Device RGB values corresponding to the target RGB values are calculated as described above. 8 bits or more may be output, in consideration of the gradation characteristics.

Furthermore, since the color correction table also depends on the color reproduction range of the printing apparatus as described above, for example, in the case where different types of recording paper are used for recording, tables corresponding to the types of recording paper may be prepared. After the color correction processing is performed for the image to be printed by the color correction portion 305 as described above, the color-corrected image is transmitted to an ink color conversion portion 306.

The ink color conversion portion 306 converts the Device RGB values determined by the color correction portion into ink colors CMYK. In the conversion, a color separation table 316 in which the values of ink colors corresponding to the combinations of the Device RGB are described in advance, is used. For this block, as with the color correction portion 305, a table of 17 grid points is used.

Figures 6, 7:
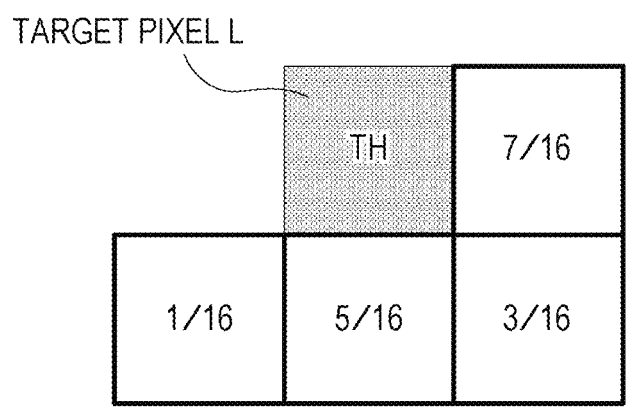
FIG. 6 illustrates an example of a color separation table.
FIG. 7 is a diagram illustrating an error distribution method in an error diffusion method.

FIG. 6 illustrates an example of the color separation table 316. In this embodiment, for example, values of four colors: cyan (C), magenta (M), yellow (Y), and black (K), corresponding to the individual grid points are described as ink colors. These values are determined taking into consideration that ink does not bleed on recording paper and ink bleeding does not occur when two pieces of ink are closed to each other. That is, in the case where different types of recording paper are used, color separation tables 316 corresponding to the different types of recording paper may be prepared.

As with the color correction portion described above, values to be obtained after ink separation corresponding to the target Device RGB values may be obtained by using the tetrahedral interpolation processing described with reference to FIGS. 5A and 5B. After the image data is converted into CMYK data as described above, the converted data is transmitted to a density correction portion 307.

In the case of ink jet recording, as the amount of ink applied as dots on recording paper increases, overlapping of dots increases, and it becomes more difficult for the recording density to increase. Therefore, the density correction portion 307 corrects the density to achieve a uniform density responsiveness. With the density correction, the accuracy at the time of creation of the above-mentioned color correction table 315 and color separation table 316 can be easily ensured. Since the correction can be performed for each of C, M, Y, and K, a one-dimensional density correction table 317 is used here. A table corresponding to 8 bits (256 gradation levels) of input of individual colors can be prepared. Thinning is not particularly required, and the table only needs to describe values corresponding to individual signal values. The data on which the density correction has been performed as described above is transmitted to a gradation conversion portion 308.

The gradation conversion portion 308 converts multi-bit data which has been subjected to ink color conversion and density correction into a recording signal, in accordance with the number of gradation levels that can be printed by the printing apparatus. For an explanation of gradation conversion processing, a recording signal of two gradation levels (1 bit): record (1) and non-record (0), will be described below. As a gradation conversion method, an error diffusion method capable of eliminating a high frequency component of an image and reproducing a visually suitable gradation level is used. In addition, for example, 0 to 255 (8 bits) will be explained as an input signal of multi-bit data.

FIG. 7 is a diagram illustrating an error distribution method in an error diffusion method. When the signal value of a target pixel is represented by L, the signal value L is compared with a threshold value TH. In order to represent 0 to 255 as binary data, a threshold value used here is set to 127. According to the magnitude, determination results described below are obtained.
L>TH (127) . . . 1 (record)
L≤TH (127) . . . 0 (non-record)
Then, in accordance with a determination result, a quantization representative value V is set as described below.
1 (record) . . . 255
0 (non-record) . . . 0
By setting the quantization representative value V as described above, an error E (=L−V) generated is distributed to pixels around the target pixel. More specifically, in accordance with the proportion of distribution factors illustrated in FIG. 7, the error is distributed to pixels positioned on the lower left, below, lower right, and right of the target pixel. In the case where a distribution target pixel exists only on the right of the target pixel, the error is directly added to the pixel on the right of the target pixel. Then, the pixel on the right of the target pixel turns to a new target pixel, a value La obtained by adding a distributed error Ea(E×7/16) to the signal value L of the new target pixel is compared with a threshold value. Therefore, determination results described below are obtained.
La>TH (127) . . . 1 (record)
La≤TH (127) . . . 0 (non-record)
Since the error Ea of the luminance value with respect to the quantization representative value V is within a range from −127 to +126, the value La to be compared with the threshold value is within a range from −127 to +381.

By performing the above processing for all the pixels in the lower right direction of the image for all the ink colors C, M, Y, and K, recordable 1-bit ink color data (recording signal) can be obtained.

An ejection amount conversion portion 309 converts data corresponding to individual dots to be printed obtained by gradation conversion by the gradation conversion portion 308 into data for ink ejection from the recording head 101. More specifically, data corresponding to the number of gradation levels to be obtained after gradation conversion (for example, data of three gradation levels "0", "1", and "2") into data representing the amount of ink per dot corresponding to the number of gradation levels and the number of ink ejection times per dot. The amount of ink and the number of ejection times may be determined in accordance with the quality of printing set in printing settings and the type of paper on which printing is performed.

FIG. 9 is a diagram illustrating an example of the amount of ink corresponding to one dot of data and the number of ink ejection times determined by the ejection amount conversion portion 309. In the example of FIG. 9, the case where multi-valued data is converted into binary data by the gradation conversion portion 308 is illustrated. In the case where data for a pixel is "1 (record)", the amount of ink ejected for the one dot is 10 pl (picoliter), and the number of ink ejection times for the one pixel is two. The ejection amount conversion portion 309 may also perform conversion into different amounts of ink and the different numbers of ejection times in accordance with ink colors C, M, Y, and K of ejected ink.

The gradation conversion portion 308 converts data obtained after gradation conversion into a recording signal for informing the recording head 101 of the amount of ink and the number of ejection times determined as illustrated in FIG. 9, and transmits the recording signal to the recording head 101.

The recording head 101 performs ink ejection in accordance with the recording signal transmitted from the gradation conversion portion 308 as described above, and an image is formed on the recording medium. Accordingly, an image corresponding to the JPEG image data input to the input interface 201 is recorded onto the recording medium.

In this embodiment, in the conversion into ejection data by the ejection amount conversion portion 309, the above-described conversion processing is performed in accordance with the degree of compression of the image data to be printed calculated by the compression degree calculation portion 310.

The compression degree calculation portion 310 calculates the degree of compression on the basis of the quantization table that was used for compression and which is acquired by the attached information acquisition portion 301. More specifically, the similarity between the quantization table and each of the quantization tables corresponding to compression Q factors illustrated in FIGS. 10A, 10B, and 10C recorded in advance. Then, in each of the quantization tables recorded in advance, a Q factor representing the degree of compression is set. A method for determining a Q factor (Quantization factor) of a quantization table with a high similarity as the degree of compression, will be explained below.

FIGS. 10A, 10B, and 10C are diagrams illustrating examples of a quantization table stored in advance in the printing apparatus. In FIG. 10A, the Q factor is 50. In FIG. 10B, the Q factor is 75. In FIG. 10C, the Q factor is 90. A quantization table is set in such a manner that as the Q factor increases, the degree of compression decreases (the compression ratio becomes lower), and degradation by compression and expansion decreases. These quantization tables are stored in the ROM 204.

The compression degree calculation portion 310 compares the quantization table of the JPEG data acquired by the attached information acquisition portion 301 with each of the quantization tables illustrated in FIGS. 10A, 10B, and 10C, and determines the similarity between them. As illustrated in FIGS. 10A to 10C, a JPEG quantization table holds 8×8 (=64) tables for luminance and color difference. Then, as represented by Equation 3, the difference between the quantization table of the JPEG image to be printed and each of the plurality of quantization tables illustrated in FIGS. 10A to 10C, which are stored in advance in the ROM 204 is obtained.

$$R = \sum_{y=0}^{7}\sum_{x=0}^{7}\{Ya(x,y) - Yb(x,y)\} + \sum_{y=0}^{7}\sum_{x=0}^{7}\{Cba(x,y) - Cbb(x,y)\} + \sum_{y=0}^{7}\sum_{x=0}^{7}\{Cra(x,y) - Crb(x,y)\}$$

Equation 3

In Equation 3, Ya(x,y), Cba(x,y), and Cra(x,y) represent quantization values of the luminance Y, the color difference Cb, and the color difference Cr of a quantization factor linked with a Q factor and held in advance at a coordinate position (x,y). In addition, Yb(x,y), Cbb(x,y), and Crb(x,y) represent the luminance Y, the color difference Cb, and the color difference Cr obtained from target JPEG attached information at the coordinate position (x,y).

Then, the Q factor at the time when the JPEG data was compressed is determined on the basis of the similarities corresponding to the quantization tables illustrated in FIGS. 10A to 10C and the Q factors corresponding to the individual quantization tables. Accordingly, although the Q factors of the quantization tables illustrated in FIGS. 10A to 10C are discrete from one another, such as 50, 70, and 90, values of a wide range from less than 50 to more than 90 can be determined as a Q factor of the JPEG data to be printed.

The method for calculating the degree of compression is not limited to the above. The degree of compression may be calculated by weighting a quantization table. Weight is set as a similarity R for the difference between quantization tables, as in Equation 4. For example, a weight Wy for the difference in the luminance between quantization tables is set to be high, and weights Wcb and Wcr for the differences in the color difference between the quantization tables are set to be low. This is because regarding the difference in density of pixel data, luminance is visually more conspicuous than color difference. A method for giving priority to a smaller difference in luminance between the quantization tables may be employed.

$$R = \sum_{y=0}^{7}\sum_{x=0}^{7}\{Ya(x,y) - Yb(x,y)\} \times Wy + \sum_{y=0}^{7}\sum_{x=0}^{7}\{Cba(x,y) - Cbb(x,y)\} \times Wcb + \sum_{y=0}^{7}\sum_{x=0}^{7}\{Cra(x,y) - Crb(x,y)\} \times Wcr$$

Equation 4

For example, weighting may be performed in 64 quantization tables. Various other methods for identifying the degree at which the image data was compressed may be adopted.

The smallest similarity R is selected, and the Q factor of the selected similarity R is defined as the degree of compression. Although Q factors are provided in three stages in this embodiment, a larger number of stages may be provided. Furthermore, more detailed Q factors may be set based on the value of the similarity R.

The degree of compression calculated as described by the compression degree calculation portion 310 is transmitted to a parameter determination portion 311.

The parameter determination portion 311 determines various parameters for performing printing on the basis of the degree of compression calculated by the compression degree calculation portion 310. The details of the processing will be described later.

Figure 8A:
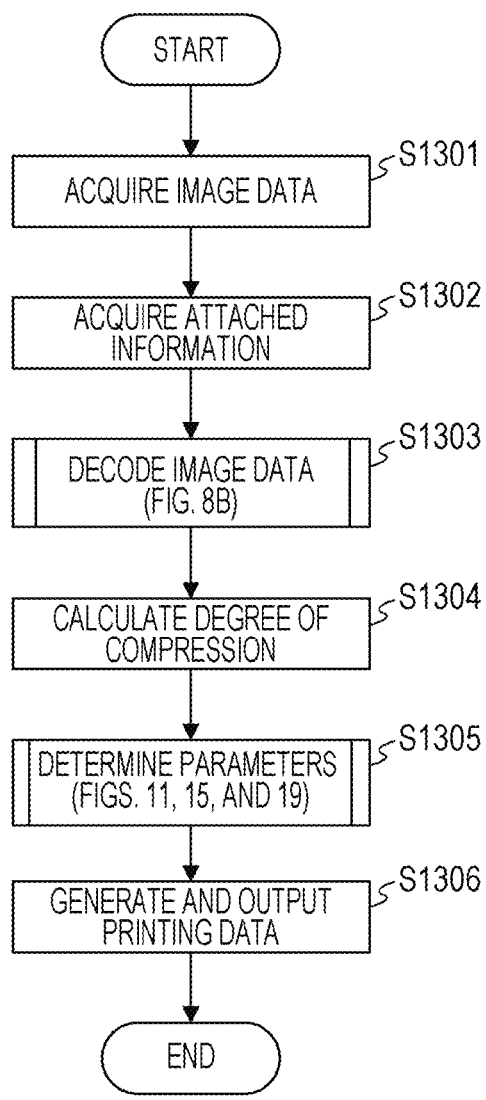
FIGS. 8A and 8B are flowcharts illustrating examples of processes performed by a CPU according to an embodiment.
Figure 8B:
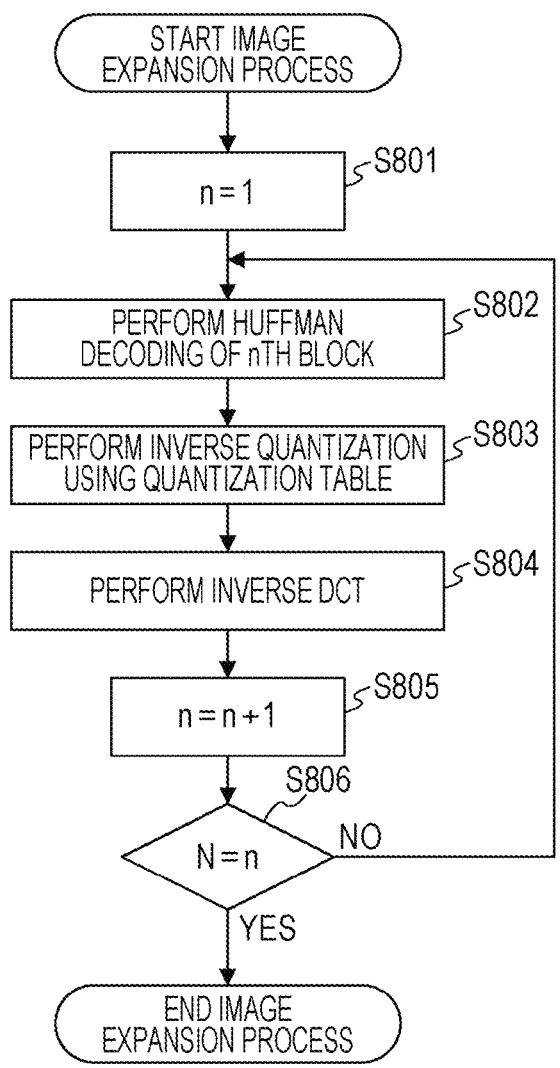

FIGS. 8A and 8B are flowcharts illustrating examples of processes performed by the CPU 202 according to an embodiment. A program corresponding to the processes illustrated as the flowcharts of FIGS. 8A and 8B is stored as a software module illustrated in FIG. 3 in the ROM 204, and the processes illustrated in FIGS. 8A and 8B are implemented when the CPU 202 executes the program.

In S1301, the attached information acquisition portion 301 acquires compressed image data and information regarding compression as attached information of the image data. In this embodiment, JPEG-encoded image data is acquired.

In S1302, the attached information acquisition portion 301 acquires the attached information from the image data acquired in S1301, and acquires a Q table, which is a compression parameter.

Next, in S1303, the image data expansion portion 302 performs decoding processing for the compressed image data by performing a decoding process, which will be described later with reference to FIG. 8B, by using the image data and the Q table acquired in S1302.

Next, in S1304, the compression degree calculation portion 310 determines the similarity between the Q table acquired in S1302 and each of the plurality of Q tables stored in the ROM 204 illustrated in FIGS. 10A to 10C, as explained with reference to FIGS. 10A to 10C and Equations 3 and 4. Then, the degree of compression is obtained by identifying the degree of compression (Q factor) corresponding to a Q table with a high similarity.

Next, in S1305, the parameter determination portion 311 determines various parameters to be used for printing of the image data acquired in S1301, in accordance with the degree of compression calculated in S1304. The processing performed in S1305 will be described later with reference to FIGS. 11, 15, and 19.

Next, in S1306, in accordance with the parameters determined in S1305, printing data is generated by processing by the color correction portion 305, the ink color conversion portion 306, the density correction portion 307, the gradation conversion portion 308, and the ejection amount conversion portion 309. Then, the generated printing data is output to the printing engine, and an image is printed by the printing engine. That is, in S1306, as the printing engine, the recording head 101 and a roller for conveying a printing medium, which is not illustrated, are controlled by the printing control processing by the CPU 202, and printing by the printing engine is performed.

The expansion processing in S1303 will be explained in detail with reference to FIG. 8B. FIG. 8B illustrates an example of the case where the compression method is a JPEG method.

FIG. 8B is a flowchart of a decoding process for image data. A program corresponding to the process illustrated as the flowchart of FIG. 8B is stored as a program module of the image data expansion portion 302 in the ROM 204, and the process illustrated in FIG. 8B is implemented when the CPU 202 executes the program.

An image in the JPEG data method is obtained by performing compression processing for each N square blocks each including 8 pixels. In FIG. 8B, initialization is performed by setting a variable n representing a block as a target of expansion processing to 1 (S801).

Next, Huffman decoding is performed for the 8-pixel square block n to be processed (S802). Then, inverse quantization is performed using a quantization table (Q table) acquired by the attached information acquisition portion 301 (S803). Then, inverse DCT is performed (S804).

Next, the variable n is incremented by one (S805), and a comparison between the incremented variable n and the number N of all blocks of the image is performed (S806).

If the variable n is less than the number N of all blocks, it is determined that a block to be processed remains, and processing of S802 to S805 is repeated. The number N of all blocks may be obtained by dividing the number of vertical and horizontal pixels represented as the image data size acquired by the attached information acquisition portion 301 by 8 pixels.

Huffman encoding is a method for performing compression by reducing the number of the entire bits by allocating a short code of a small number of bits to data of a high appearance frequency. In the Huffman decoding in S802, decoding is performed using Huffman code corresponding to the Huffman encoding.

In the inverse quantization in S803, inverse quantization is performed using the quantization table which was used for compression and which is acquired by the attached information acquisition portion 301, and development to image data is performed.

The inverse DCT in S804 is processing for performing inverse transform for returning image data which has been divided into DC components and AC components by DCT to the original image density components. The JPEG compression may be performed in a method of the luminance Y and the color differences Cb and Cr. In this case, data on which inverse DCT processing has been performed has a YCbCr form. Image signal values RGB are obtained in accordance with Equation 1.

$$R=(Y+128)+1.402(Cr-128)$$

$$G=(Y+128)-0.34414(Cb-128)-0.71414(Cr-128)$$

$$B=(Y+128)+1.772(Cb-128) \quad \text{Equation 1:}$$

The image signal values RGB obtained as described above are input to the image correction portion 303, and processing from the image correction portion 303 to the ejection amount conversion portion 309 is performed.

Hereinafter, the details of the parameter determination processing in S1305 will be explained.

Figure 11:
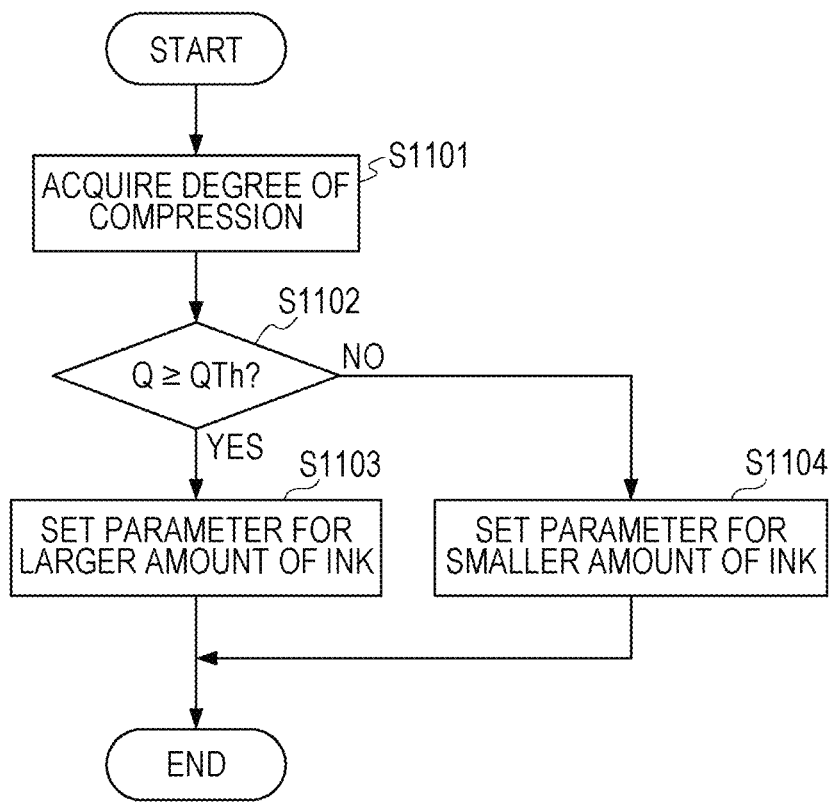
FIG. 11 is a flowchart illustrating an example of a process performed by a parameter determination portion.

FIG. 11 is a flowchart illustrating an example of a process performed by the parameter determination portion 311. A program corresponding to the process illustrated as the flowchart of FIG. 11 is stored in the ROM 204, and the process illustrated as the flowchart of FIG. 11 is implemented when the CPU 202 executes the program on the RAM 205.

In S1101, compression degree acquisition processing for acquiring a Q factor representing the degree of compression calculated by the compression degree calculation portion 310 is performed. As described above, a higher Q factor represents a lower degree of compression, and a lower Q factor represents a higher degree of compression. That is, there is a tendency that image degradation by lossy compression and expansion decreases as the Q factor increases, and the image degradation increases as the Q factor decreases.

In S1102, a determination of the degradation degree of mosquito noise by compression is performed by comparing the Q factor acquired in S1101 with a threshold value QTh. The threshold value QTh may be set appropriately by understanding the Q factor and the degree of occurrence of noise corresponding to the Q factor in advance. Furthermore, since the degree of allowable noise differs according to whether an image to be printed is a photograph or a document, different threshold values QTh may be set in accordance with types of images.

Then, in accordance with a result of the determination in S1102, an ejection amount parameter 319 to be obtained by the ejection amount conversion portion 309 is determined in S1103 or S1104. Examples of the amount of ink based on individual determination results are illustrated in FIGS. 12A and 12B.

FIGS. 12A and 12B are diagrams each illustrating the amount of ink ejection per dot and the number of dots per pixel corresponding to a Q factor.

As illustrated in FIG. 12A, when the Q factor is equal to or more than a threshold value (when the degree of compression is low and noise is less likely to occur), the amount of ink ejection per dot is set to 10 picoliter, and the number of dots per pixel is set to 2. In contrast, when the Q factor is less than the threshold value (when the degree of compression is high and noise is more likely to occur), the amount of ink ejection per dot is set to 5 picoliter, and the number of dots per pixel is set to 4, as illustrated in FIG. 12B. In both the examples of FIGS. 12A and 12B, 20 picoliter of ink is used per pixel. As described above, by setting the total amount of ink per pixel to be the same between the case where the Q factor is equal to or more than the threshold value and the case where the Q factor is less than the threshold value, printing results on the recording medium as similar as possible to each other can be achieved, regardless of the Q factor.

When it is determined in S1102 that the Q factor is equal to or more than QTh, that is, image gradation by compression is small, the process proceeds to S1103. In S1103, it is determined that two dots of ink are ejected per pixel and each dot has 10 picoliter of ink, and a parameter indicating the determination result is determined.

When it is determined in S1102 that the Q factor is less than QTh, that is, image gradation by compression is large, the process proceeds to S1104. In S1104, it is determined that four dots of ink are ejected per pixel and each dot has 5 picoliter of ink, and a parameter indicating the determination result is determined.

As described above, the number of dots per pixel for the case where the Q factor is small (noise is more likely to occur) is set to be greater than the number of dots per pixel for the case where the Q factor is large (noise is less likely to occur). The above settings are made for the reasons below.

With the settings illustrated in FIG. 12B, a large number of relatively small dots are ejected. In this case, for example, even if mosquito noise generated by expansion is printed, a large number of fine ink dots are printed. That is, on the recording medium, a noise portion has high frequency components.

Figure 14:
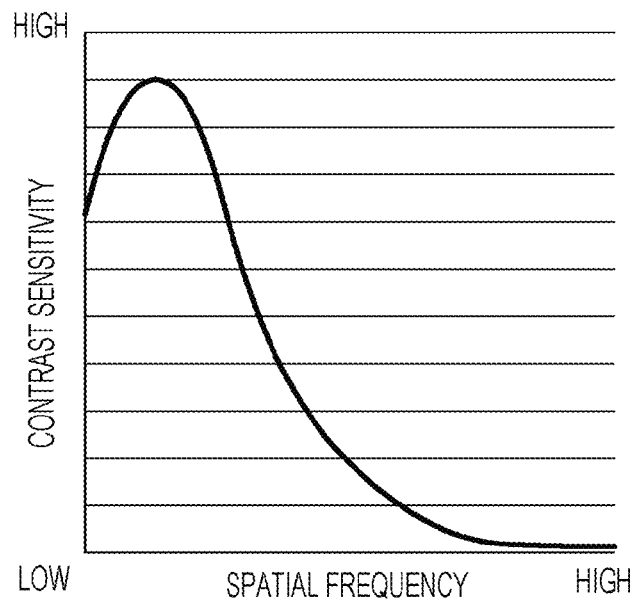
FIG. 14 is a diagram illustrating the relationship between a frequency component and a perception sensitivity.

In terms of human visual characteristics, it is difficult for human beings to detect high frequency components. FIG. 14 is a diagram illustrating the relationship between a frequency component and a perception sensitivity. That is, in the case where the amount of ink per dot is small as in FIG. 12B, even if the number of dots increases, it is difficult to detect fine dots on the recording medium. Therefore, in the case where the amount of ink per dot is small, a printing result in which mosquito noise is relatively inconspicuous can be obtained, compared to the case where the amount of ink per dot is large.

Figure 13A:
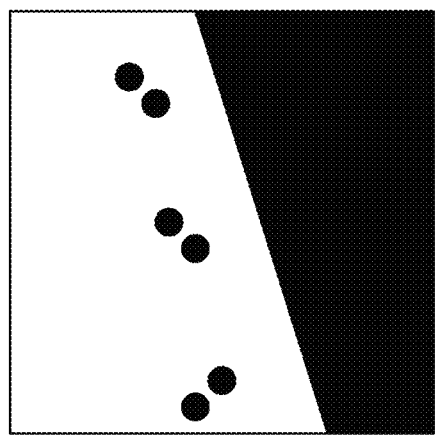
FIGS. 13A and 13B are diagrams illustrating printing results corresponding to the amount of ink per dot.
Figure 13B:
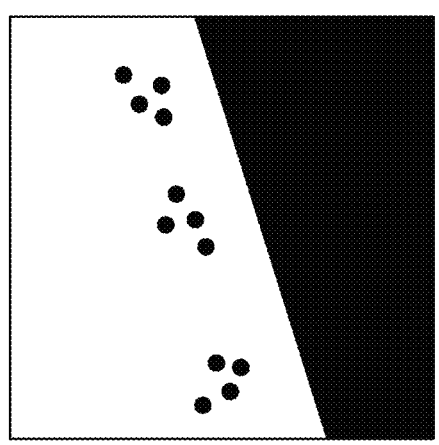

FIGS. 13A and 13B are diagrams illustrating printing results corresponding to the amount of ink per dot. In each of FIGS. 13A and 13B, dots in a left portion represents an example in which noise is printed. In the case of FIG. 13B, the amount of ink per dot is small and the number of dots is large, compared to FIG. 13A. That is, frequency components in a region corresponding to noise are higher than those of FIG. 13A. Therefore, a printing result in which it is difficult to detect noise in terms of human visual characteristics, can be obtained.

Therefore, in S1104, when the Q factor is less than the threshold value (when noise is more likely to occur), the amount of ink per dot is set to be small.

If a certain pixel is printed in a region on a recording medium with a small amount of ink per dot and with a large amount of ink per dot, the number of nozzles used for the region in the case where the amount of ink per dot is small is greater than that in the case where the amount of ink per dot is large. Furthermore, ejection of ink from all the nozzles of the recording head at the same time requires a large amount of power. Therefore, it is difficult to cause ink to be ejected from all the nozzles. Thus, ink ejection is sequentially performed by slightly shifting time. Therefore, for printing of lines, such as vertical ruled lines, deviation of lines increases as the number of nozzles used increases (as the amount of ink per dot decreases).

In the case where the possibility of noise generation is low, it may be desirable that the amount of ink per dot be large and the number of dots be small. Thus, in S1103, when the Q factor is equal to or more than the threshold value (when the possibility of large image degradation is low), a parameter for a large amount of ink per dot and a smaller number of dots is set.

As illustrated in FIG. 3, the ejection amount parameter 319 determined by the parameter determination portion 311 is used by the ejection amount conversion portion 309. As illustrated in FIGS. 12A and 12B, the amount of ink per dot and the number of dots per pixel corresponding to the Q factor (the degree of compression) are determined. Then, the ejection data on which the conversion processing by the ejection amount conversion portion 309 has been performed is output to the printing engine, and printing is performed in accordance with the amount of ink and the number of dots determined as described above.

Accordingly, in the case where the Q factor representing the degree of compression is low (the case where the degree of compression is high and noise is more likely to occur), degradation of the color reproductivity can be prevented, and dots of high frequency components can be arranged on the recording medium. Therefore, even if mosquito noise occurs, a printing result in which the noise is less visible can be obtained.

In the case where the Q factor is high (the case where the degree of compression is low and noise is less likely to occur), by increasing the amount of ink per dot, image degradation caused by deviation of dots can be suppressed in printing of ruled lines and characters.

Hereinafter, an example in which the parameter determination portion 311 determines a parameter of the number of gradation levels to be used by the gradation conversion portion 308, in accordance with the Q factor (degree of compression) of image data which has been compressed in the lossy compression method, will be explained. As with the processing described above, the processing described below is also implemented by the configuration illustrated in FIG. 2 and the modules illustrated in FIG. 3.

Figure 15:
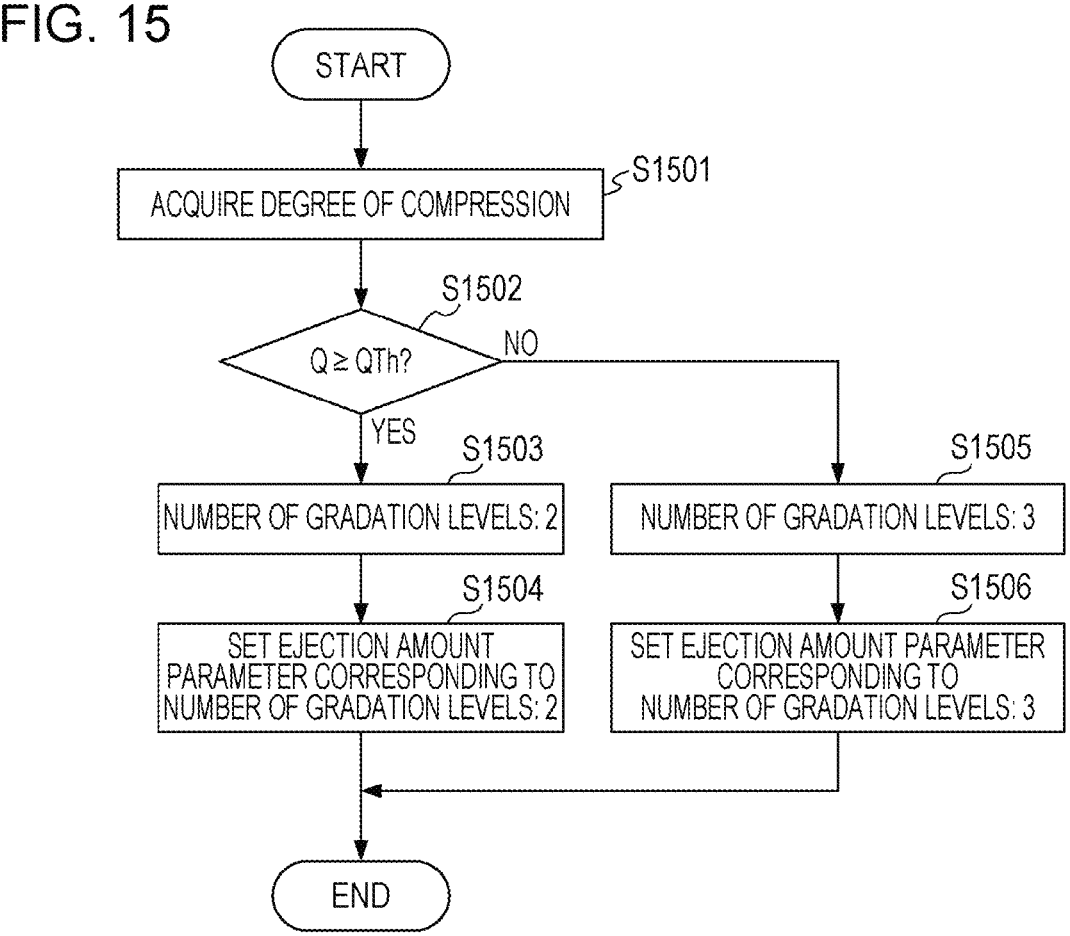
FIG. 15 is a flowchart illustrating an example of a process performed by the parameter determination portion.

FIG. 15 is a flowchart illustrating a process for determining a number-pf-gradation-levels parameter 318 by the parameter determination portion 311 illustrated in FIG. 3 on the basis of the degree of compression calculated by the compression degree calculation portion 310. As with FIG. 11, a program corresponding to the flowchart is stored in the ROM 204, and the flowchart illustrated in FIG. 15 is implemented when the CPU 202 executes the program on the RAM 205.

Processing of S1501 and S1502 is similar to processing in S1101 and S1102. Therefore, the explanation for the similar processing will be omitted.

When it is determined in S1502 that the Q factor is equal to or more than QTh1 (when it is determined that the degree of compression is less than or equal to the threshold value), the process proceeds to S1503. In S1503, the number of gradation levels to be obtained after gradation conversion by the gradation conversion portion 308 is determined to be "2", and a parameter for the number of gradation levels "2" is set as the number-of-gradation-levels parameter 318.

In S1504, an ejection amount parameter corresponding to the number of gradation levels "2" determined in S1503 is set as the ejection amount parameter 319 to be used by the ejection amount conversion portion 309.

When it is determined in S1502 that the Q factor is less than QTh1 (when it is determined that the degree of compression is more than the threshold value), the process proceeds to S1505. In S1505, the number of gradation levels to be obtained after gradation conversion by the gradation conversion portion 308 is determined to be "3", and a parameter for the number of gradation levels "3" is set as the number-of-gradation-levels parameter 318.

In S1506, an ejection amount parameter corresponding to the number of gradation levels "3" determined in S1503 is set as the ejection amount parameter 319 to be used by the ejection amount conversion portion 309.

With the process illustrated in FIG. 15, the number of gradation levels corresponding to the Q factor is determined as the number of gradation levels to be obtained after gradation conversion by the gradation conversion portion 308. As described above, the gradation conversion portion 308 performs gradation conversion to achieve a smaller number of gradation levels in conversion from multi-valued image data into data for printing. Next, the number of gradation levels to be obtained after gradation conversion set by the process illustrated in FIG. 15 will be explained.

When it is determined that the Q factor is equal to or more than QTh (Yes in S1502), the number of gradation levels is set to "2", which is smaller than "3" to be set when it is determined that the Q factor is less than QTh (No in S1502).

When the number of gradation levels is 2, in order to represent a signal value L of a pixel of interest in multi-valued image data (=input value+propagation error from a peripheral pixel by error diffusion processing) as binary data, a threshold used here is set to 127. According to the magnitude, determination results described below are obtained.

L>127 ... 1 (record)
L≤127 ... 0 (non-record)

Since the signal value L is obtained by adding a propagation error (−127+127) by error diffusion processing to the input value (0 to 255), the signal value L ranges from −127 to 382.

In contrast, when it is determined that the Q factor is less than QTh, the number of gradation levels is set to 3. In order to represent the signal value L as ternary data, threshold values used here are set to 85 and 170. According to the magnitude, determination results described below are obtained.

L>170, ... 2 (record)
170≥L>85 ... 1 (record)
L≤85 ... 0 (non-record)

In S1504 and S1506, the amount of ink per dot and the number of dots per pixel are determined as ejection amount parameters corresponding to individual numbers of gradation levels.

FIGS. 16A and 16B are diagrams each illustrating the amount of ink per dot and the number of dots per pixel corresponding to gradation data. As illustrated in FIG. 16B, in the case where the number of gradation levels is 3, in order to express a half tone, two dots of ink are ejected per pixel when gradation data is 2 (record) and one dot of ink is ejected per pixel when gradation data is 1 (record).

Figure 17A:
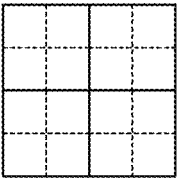
FIGS. 17A and 17B are diagrams for explaining dot formation and robustness corresponding to the number of gradation levels.
Figure 17B:
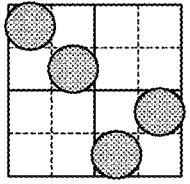

FIGS. 17A and 17B are diagrams for explaining dot formation and robustness corresponding to the number of gradation levels.

FIG. 17A is a diagram illustrating ink ejection results in the case where the amount of ink ejection against a predetermined region is 0%, 50%, and 100% when the number of gradation levels is "2" and "3". The case where the amount of ink ejection is 0% represents the case where all the pixels in the predetermined region are 0 (non-record).

The case where the amount of ink ejection is 100% represents the case where all the pixels are 1 (record) when the number of gradation levels is "2" and the case where the all the pixels are 2 (record) when the number of gradation levels is "3". The case where the amount of ink ejection is 50% represents the case where one half of all the pixels in the predetermined region is 1 (record) and the other half is 0 (non-record) when the number of gradation levels is "2". When the number of gradation levels is "3", all the pixels are 1 (record). That is, the case where the amount of ink ejection is 50% represents the case where the amount of ink ejection is half the amount of ink used when the amount of ink ejection against the predetermined region is 100%.

FIG. 17B illustrates dot formation in the case where the ink impact position is deviated at the time of half tone printing due to displacement of the recording head installed or the like. In this case, as is clear from FIG. 17B, in the case where the number of gradation levels is "3", dots are more likely to overlap due to the deviation than the case where the number of gradation levels is "2". That is, when the number of gradation levels is set to be smaller, such as "2", the dot coverage is less likely to be changed by the deviation of the impact position. Therefore, the case where the number of gradation levels is "2" achieves a higher robustness against the deviation in half tone printing than the case where the number of gradation levels is "3". Accordingly, in S1503 of FIG. 15, when the Q factor is equal to or more than the threshold value (when the degree of compression is less than or equal to the threshold value and noise is less likely to occur), the number of gradation levels is set to "2".

In contrast, in S1503 of FIG. 15, when the Q factor is less than the threshold value (when the degree of compression is more than the threshold value and noise is more likely to occur), the number of gradation levels is set to "3". The reason for this will be described with reference to FIGS. 18A and 18B.

Figure 18A:
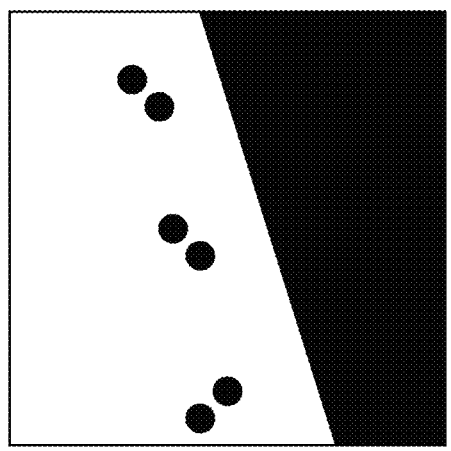
FIGS. 18A and 18B are diagrams illustrating printing results obtained when noise is printed in the case where the number of gradation levels is "2" and "3".
Figure 18B:
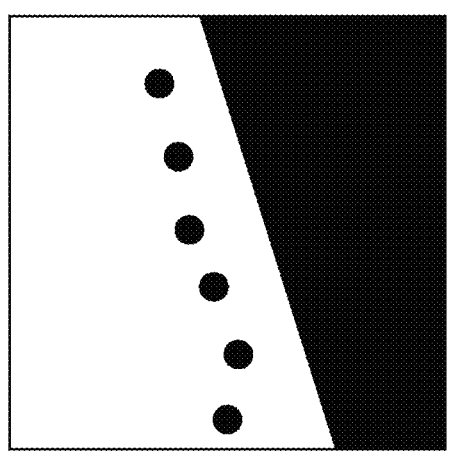

FIGS. 18A and 18B are diagrams illustrating printing results obtained when noise is printed in the case where the number of gradation levels is "2" and "3".

The signal value L of mosquito noise often appears as a half tone. Therefore, in the case where noise is printed, a pixel of noise is often recorded as 1 (record) when the number of gradation levels is "3". Then, as with dot formation explained with reference to FIGS. 17A and 17B, the distance between dots against noise in the case where recording is performed with one dot per pixel when the number of gradation levels is "3" is longer than that in the case where recording is performed with two dots per pixel when the number of gradation levels is "2". That is, when the number of gradation levels is large, dots of noise to be recorded as a half tone can be more dispersed than the case where the number of gradation levels is small. Accordingly, in a printing result, higher frequency components can be achieved for mosquito noise. Thus, based on the perception characteristics illustrated in FIG. 14, a printing result in which mosquito noise is less visible can be obtained.

Accordingly, in S1503 of FIG. 15, when the Q factor is less than the threshold value (when the degree of compression is more than the threshold value and noise is more likely to occur), the number of gradation levels is set to "3".

As explained above with reference to FIG. 15, the number-of-gradation-levels parameter 318 and the ejection amount parameter 319 determined by the parameter determination portion 311 in accordance with the Q factor are used for processing by the gradation conversion portion 308 and the ejection amount conversion portion 309.

Accordingly, in the case where the Q factor is low (the case where noise is more likely to occur), dots having high frequency components can be arranged on the recording medium. Consequently, it is possible for mosquito noise to be made less detectable by human eyes.

Furthermore, in the case where the Q factor is high (the case where noise is less likely to occur), by reducing the number of gradation levels, the robustness against deviation in ink impact can be increased.

Next, an example in which the parameter determination portion 311 determines the color separation table 316 to be used by the ink color conversion portion 306, in accordance with the Q factor (degree of compression) of image data which has been compressed in the lossy compression method, will be explained. That is, the parameter determination portion 311 determines the color of ink to be used for printing of the image, in accordance with the degree of compression of the image which has been compressed in the lossy compression method. As with the processing described above, the processing described below is implemented by the configuration illustrated in FIG. 2 and the modules illustrated in FIG. 3.

Figure 19:
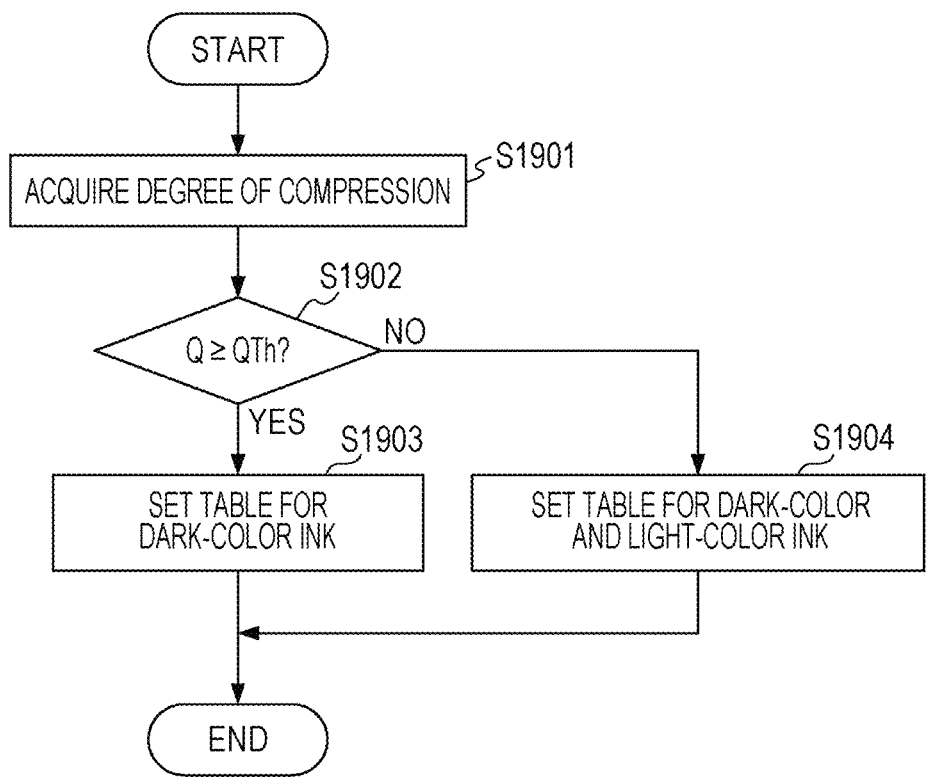
FIG. 19 is a flowchart illustrating an example of a process performed by the parameter determination portion.

FIG. 19 is a flowchart illustrating a process for determining the color separation table 316 by the parameter determination portion 311 illustrated in FIG. 3 on the basis of the degree of compression calculated by the compression degree calculation portion 310.

Processing in S1901 and S1902 is similar to processing in S1101 and S1102 in FIG. 11. Therefore, the explanation for the similar processing will be omitted.

In the process illustrated in FIG. 19, in accordance with a result of the determination in S1902 (determination as to whether or not the Q factor is equal to or more than the threshold value), the color separation table 316 to be used by the ink color conversion portion 306 is determined.

FIGS. 20A and 20B are diagrams illustrating the color separation table 316 corresponding to a Q factor. FIG. 20A illustrates a table adopted when the Q factor is equal to or more than the threshold value. In the table illustrated in FIG. 20A, dark-color ink of four colors: C (cyan), M (magenta), Y (yellow), and K (black) is set as ink colors to be used for printing. In contrast, FIG. 20B illustrates a table adopted when the Q factor is less than the threshold value. In the table illustrated in FIG. 20B, in addition to the dark-color ink of C, M, Y, and K, light-color ink of Lc (light cyan) and Lm (light magenta) is set as ink colors to be used for printing.

Values of individual grids of the color separation tables illustrated in FIGS. 20A and 20B are set so that a table of only dark-color ink and a table of dark-color ink and light-color ink have the same colorimetric values, and the same color reproduction can be achieved in printing results for both the tables. Furthermore, in the case of the table using dark-color ink and light-color ink in FIG. 20B, light-color ink is used for a half tone for individual colors, and only the same dark-color ink as in the table of only dark-color ink is used for the darkest signal value, such as black (R,B,G)=(0,0,0). Accordingly, the same reproduction of black characters or the like can be achieved in both the tables illustrated in FIGS. 20A and FIG. 20B.

In S1903, when the Q factor is equal to or more than the threshold value (when the degree of compression is less than or equal to the threshold value and noise caused by lossy compression is less likely to occur), the table illustrated in FIG. 20A is set as the color separation table 316 to be used by the ink color conversion portion 306.

In S1904, when the Q factor is less than the threshold value (when the degree of compression is more than the threshold value and noise caused by lossy compression is more likely to occur), the table illustrated in FIG. 20B is set as the color separation table 316 to be used by the ink color conversion portion 306.

The reason why the color separation table is set as described above will be described with reference to FIGS. 21A and 21B.

In the case where only dark-color ink is used for printing as in the table illustrated in FIG. 20A, the amount of ink usage is reduced and printing of a dark portion can be performed. Reducing the amount of ink usage means suppressing ink bleeding on the recording medium. This is an important factor for printing characters and the like.

Therefore, when the Q factor is equal to or more than the threshold value (when the degree of compression is less than or equal to the threshold value and noise caused by lossy compression is less likely to occur), the table illustrated in FIG. 20A is adopted, so that only dark-color ink is used for printing.

In contrast, in the case where dark-color ink and light-color ink are used, a light color, which is difficult to express only with dark-color ink, can be expressed. Furthermore, the color separation table illustrated in FIG. 20B is set in such a manner that, for example, in the case where one dot of C and two dots of Lc exhibit the same color, printing is performed with two dots of Lc.

As described above, mosquito noise generated by compression and expansion in the lossy compression method is often printed as a half tone. Therefore, in the case where mosquito noise is printed when the color separation table illustrated in FIG. 20B is set, light-color ink (Lc, Lm) is often used.

Figure 21A:
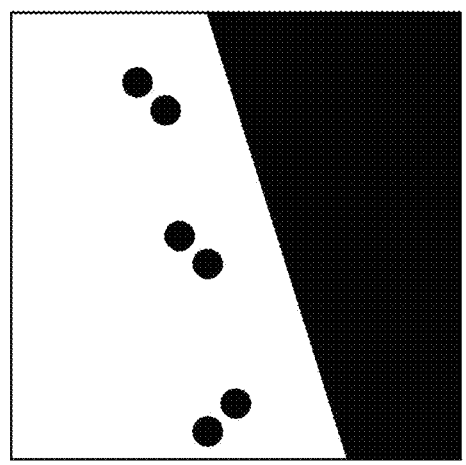
FIGS. 21A and 21B are diagrams illustrating examples of printing results obtained when mosquito noise is printed using dark-color ink and when mosquito noise is printed using dark-color ink and light-color ink.
Figure 21B:
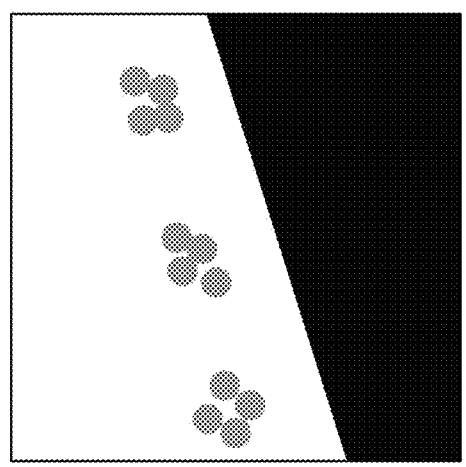

FIGS. 21A and 21B are diagrams illustrating examples of printing results obtained when mosquito noise is printed using dark-color ink and when mosquito noise is printed using dark-color ink and light-color ink.

As illustrated in FIGS. 21A and 21B, in the case where printing is performed using dark-color ink and light-color ink, the spatial frequency of noise in a printing result may be increased compared to the case where printing is performed using only dark-color ink. Furthermore, since the color of ink itself is light, the amplitude for one dot in a frequency component can be decreased.

Therefore, in the case where printing is performed using dark-color ink and light-color ink (the case where the table illustrated in FIG. 20B is adopted), the spatial frequency of noise in a printing result can further be increased. Therefore, the perception sensitivity of human beings against noise can be reduced, as illustrated in FIG. 14. Furthermore, not only the increase in the spatial frequency but also the reduction in the amplitude to the spatial frequency can be achieved. That is, by reducing the perception sensitivity from two points of view, that is, by increasing the spatial frequency and reducing the amplitude, it is possible to make mosquito noise in a printing result less visible.

From the above reasons, in S1904 of FIG. 19, when the Q factor is less than the threshold value (when the degree of compression is more than the threshold value and noise caused by lossy compression is more likely to occur), the table illustrated in FIG. 20B is set as the color separation table 316 to be used by the ink color conversion portion 306. Accordingly, even if light ink is used for printing and mosquito noise occurs, by increasing the spatial frequency and reducing the amplitude in a printing result, it is possible to make the mosquito noise less visible.

The parameter determination portion 311 sets the color separation table 316 determined in accordance with the Q factor by the process illustrated in FIG. 19. Then, the ink color conversion portion 306 converts the RGB data into data of ink colors by using the color separation table 316 set as described above. Accordingly, in the case where the Q factor representing the degree of compression is low, by allowing dots arranged on the recording medium to have high frequency components and further reducing the amplitude, it is possible to make mosquito noise less likely to be detected.

In the embodiment described above, the process for determining the ejection amount parameter 319 (FIG. 11), the process for determining the number-of-gradation-levels parameter 318 (FIG. 15), and the process for determining the color separation table 316 (FIG. 19) by the parameter determination portion 311 in accordance with the Q factor have been described. However, the above-described processes are not necessarily performed individually. In an embodiment, the above-described processes may be combined together. For example, as illustrated in FIG. 15, the number-of-gradation-levels parameter 318 and the ejection amount parameter 319 may be determined in accordance with the Q factor, or both the ejection amount parameter 319 and the color separation table 316 may be determined in accordance with the Q factor. Alternatively, the number-of-gradation-levels parameter 318 and the color separation table 316 may be determined or the above three parameters may be determined with respect to a certain Q factor.

As described above, in an embodiment, parameters to be used for printing of image data are determined in accordance with a Q factor of the image data to be printed which has been compressed in the lossy compression method. Accordingly, in the case where noise is highly likely to occur due to compression, it is possible to make the noise less visible in a printing result.

In the examples of FIGS. 20A and 20B and FIGS. 21A and 21B, examples in which the density of ink and the number of dots per pixel are changed in accordance with the Q factor are explained. However, the present invention is not limited to this. Only the density of ink may be changed in accordance with the Q factor.

Furthermore, in the embodiment described above, an example in which the printing apparatus operates as an information processing apparatus and acquisition processing for lossy-compressed image data, expansion processing for the lossy-compressed image data, gradation conversion processing, and the like illustrated in FIGS. 3, 8B, 11, 15, and 19 are performed in the printing apparatus has been explained. As described above, the above processes are performed in the printing apparatus. Therefore, for example, even if an external apparatus which causes the printing apparatus to perform printing does not perform processing such as expansion processing of image data, the external apparatus is able to cause the printing apparatus to perform printing of the image data by transmitting lossy-compressed image data to the printing apparatus.

However, the present invention is not limited to the above configuration. Various apparatuses (devices including a personal computer (PC), a smartphone, a tablet, and a server on a network) which are connected to the printing apparatus and cause the printing apparatus to print an image based on data to be printed may operate as an information processing apparatus in an embodiment. In this case, for example, when a printer driver and an application corresponding to the above-described processes are installed into any of the above various apparatuses and the apparatus executes the printer driver and the application program, the above-described processes are implemented. Furthermore, in the various apparatuses, the above-described processes may be performed by the printer driver and the application in a shared manner.

Furthermore, acquisition processing for lossy-compressed image data, expansion processing for the image data, gradation conversion processing, and the like may be performed by cooperation between the various apparatuses and the printing apparatus. For example, processing up to expansion processing for image data in S1301 to S1303 in FIG. 8A is performed in the various apparatuses. Then, by transmitting the expanded image data and a Q table used for the expansion processing to the printing apparatus, the processing from S1304 to S1306 may be performed by the printing apparatus. Alternatively, in the various apparatuses, the processing for determining the various parameters (the color separation table, the number-of-gradation-levels parameter, and the ejection amount parameter) in accordance with the degree of compression in S1305 may be performed, and the printing apparatus may be informed of the determined parameters. When the processing of S1306 is performed by the printing apparatus, processing corresponding to the parameters informed from the various apparatuses may be performed by the printing apparatus. Various methods may be adopted as a method for sharing processes between the above various apparatuses and the printing apparatus.

Furthermore, although a Q table is acquired as various parameters used when image data was compressed and the degree of compression of the image data is determined by calculating a Q factor with reference to the acquired Q table in the foregoing embodiments, the present invention is not limited this. For example, identification information for identifying the degree of compression may be various types of information, such as information indicating execution or non-execution of compression, information indicating the compression ratio, and information indicating a Q factor as a numerical value.

For example, in the case where information indicating execution or non-execution of compression is acquired, when the acquired information indicates "execution" of compression, processing equivalent to that when the Q factor is less than the threshold value may be performed in the processes illustrated in FIGS. 11, 15, and 19. In contrast, when the acquired information indicates "non-execution" of compression, processing equivalent to processing in the case where the Q factor is equal to or more than the threshold value may be performed. Since mosquito noise is generated by lossy compression and expansion, information indicating execution or non-execution of lossy compression may be acquired. The case where the information indicates "non-execution" of lossy compression may include a case where lossless compression is performed on image data as well as a case where compression processing is not performed. Even in this case, for example, parameters equivalent to those in the case of "non-execution" of compression processing are set.

Furthermore, in the foregoing embodiments, a color separation table, a number-of-gradation-levels parameter, and an ejection amount parameter corresponding to the degree of compression of an image to be printed are set in advance and at the time of printing, a parameter is determined by selecting a parameter from among the preset parameters. However, such parameters are not necessarily set in advance. A new parameter may be determined at the time of printing.

Furthermore, when image data is acquired in S1301, it may be determined whether the image data has been compressed in the lossy compression method. After confirming that the image data has been compressed in the lossy compression method, the calculation of the degree of compression in S1304 and the determination of various parameters in S1305 may be performed. In the case where compression is not performed in the lossy compression method, compression is not performed, or compression is performed in a lossless compression method, parameters corresponding to a printing mode or the like or a predetermined parameter may be determined. As a predetermined parameter, for example, a parameter adopted when the Q factor is equal to or more than the threshold value may be used, for example, in the processes illustrated in FIGS. 11, 15, and 19.

In the flowcharts illustrated in FIGS. 11. 15, and 19, after expansion processing for image data is performed, a parameter corresponding to the degree of compression is determined. However, the present invention is not limited to this. Parameter determination processing may be performed before expansion processing, and processing corresponding to the determined parameter may be performed for the image data on which the expansion processing has been performed.

Furthermore, in the foregoing embodiments, as an example of halftone processing by gradation conversion, the case of an error diffusion method has been explained. However, the present invention is not limited to this. For example, a dithering method may be used. In the dithering method, gradation conversion is performed by applying a predetermined dither matrix indicating a threshold value for performing gradation conversion to multi-valued image data. Also in the dithering method, by determining a parameter in accordance with the degree of compression as in the foregoing embodiments, a printing result in which noise is less visible can be obtained.

Furthermore, although an example in which a parameter for image data is determined for printing by the printing apparatus has been explained above in the foregoing embodiments, the present invention is not limited to this. For example, in the case where an image is displayed on the display device, the process for determining a number-of-gradation levels parameter illustrated in FIG. 15 in the foregoing embodiments may be performed. In this case, the display device that performs display may perform determination of the number of gradation levels to be obtained by gradation conversion and may perform gradation conversion. Alternatively, various external apparatuses that output images to the display device may determine the number of gradation levels. In the case where the external apparatus performs the number of gradation levels, gradation conversion into the determined number of gradation levels may be performed by the external apparatus or the display device.

Furthermore, although an example of a JPEG method has been explained as an example of a lossy compression method in image compression in the foregoing embodiments, the present invention is not limited to this. Processes in the foregoing embodiments can be applied to various lossy compression methods.

Furthermore, although an example of data of a still image has been explained as an example of lossy-compressed data to be processed in the foregoing embodiments, the present invention is not limited to this. For example, in the case where a moving image in an MPEG method or the like is displayed or a frame extracted from such a moving image is printed, the number of gradation levels may be reduced. Even in such a case, the gradation conversion processing in the foregoing embodiments may be used.

Furthermore, data to be processed is not necessarily an image. The data to be processed may be, for example, audio data compressed in the lossy compression method. In the case where such audio data is expanded, due to the lossy compression method, noise sound may be generated. Furthermore, in particular, when the number of gradation levels of sound is reduced, the noise sound may be enhanced. In such a situation, by determining the number of gradation levels to be obtained after gradation conversion in accordance with the degree of compression of audio data according to the foregoing embodiments, enhancement of noise sound may be prevented.

In the foregoing embodiments, an ink jet recording apparatus has been explained as a printing apparatus. Furthermore, by taking an example of ink ejection as an example in which a recording agent is provided to a recording medium in printing, processing for determining a parameter regarding an ink ejection method in accordance with the degree of compression has been explained. However, the present invention is not limited to this. In the case where toner is provided as a recording agent to a recording medium, the processing according to the foregoing embodiments may also be applied to processing for determining a parameter regarding a toner providing method.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Furthermore, a program code for implementing functions of an embodiment may be executed by a single computer (a CPU or an MPU) or may be executed by multiple computers which cooperate with each other. Furthermore, a program code may be executed by a computer or hardware, such as a circuit for implementing the functions of the program code, may be provided. Furthermore, part of the program code may be implemented by hardware and the other parts may be executed by a computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-265236, filed Dec. 24, 2013, which is hereby incorporated by reference herein in its entirety.

What is claimed is:

1. An information processing apparatus comprising:
an acquisition unit configured to acquire information corresponding to a degree of compression of lossy-compressed image data to be printed; and
a determination unit configured to determine, based on the information acquired by the acquisition unit, a providing method of a recording agent when the image data to be printed is expanded and an image based on the expanded image data is printed,
wherein the determination unit determines the providing method in such a manner that a spatial frequency of the image in a case where the image is printed in accordance with a first providing method when the degree of compression of the image data is more than a predetermined threshold value is higher than a spatial frequency in a case where the image is printed in accordance with a second providing method when the degree of compression of the image data is less than or equal to the predetermined threshold value.

2. The information processing apparatus according to claim 1, wherein the determination unit determines, as the providing method, a number of dots corresponding to one pixel when the image is printed, and determines the number of dots in such a manner that the number of dots as the first providing method in the case where the degree of compression of the image data is more than the predetermined threshold value is greater than the number of dots as the second providing method in the case where the degree of compression of the image data is less than or equal to the predetermined threshold value.

3. The information processing apparatus according to claim 1, wherein the determination unit determines, as the providing method, an amount of the recording agent to be used per dot when the image is printed, and determines the amount of the recording agent in such a manner that the amount of the recording agent as the first providing method in the case where the degree of compression of the image data is more than the predetermined threshold value is smaller than the amount of the recording agent as the second providing method in the case where the degree of compression of the image data is less than or equal to the predetermined threshold value.

4. The information processing apparatus according to claim 1, wherein the determination unit determines, as the providing method, a number of gradation levels to be obtained when gradation conversion is performed so that the number of gradation levels of the expanded image data is reduced, and determines the number of gradation levels in such a manner that the number of gradation levels as the first providing method in the case where the degree of compression of the image data is more than the predetermined threshold value is greater than the number of gradation levels as the second providing method in the case where the degree of compression of the image data is less than or equal to the predetermined threshold value.

5. The information processing apparatus according to claim 1, wherein the determination unit determines a providing method regarding a density of the recording agent corresponding to one dot.

6. The information processing apparatus according to claim 1, further comprising a generation unit configured to generate data for printing of the image by a printing apparatus, in accordance with the providing method determined by the determination unit.

7. The information processing apparatus according to claim 6, further comprising a printing control unit configured to cause the printing apparatus to print the image, based on the data generated by the generation unit.

8. The information processing apparatus according to claim 7, further comprising, as the printing apparatus, a printing unit configured to print an image, wherein the printing control unit causes the printing unit to print the image.

9. The information processing apparatus according to claim 1, wherein the image data is image data which has been compressed in a Joint Photographic Expert Group format.

10. The information processing apparatus according to claim 1, further comprising an expansion unit configured to perform expansion processing for the lossy-compressed data, wherein the determination unit determines the providing method of the recording agent when the image based on the data expanded by the expansion unit is printed.

11. The information processing apparatus according to claim 10, wherein the acquisition unit acquires, as information corresponding to the degree of compression, information used when the data was lossy-compressed, and wherein the expansion unit performs the expansion processing based on the information acquired by the acquisition unit, and the determination unit determines the providing method based on the information.

12. The information processing apparatus according to claim 11, wherein the acquisition unit acquires, as information corresponding to the degree of compression, information used when quantization processing for lossy compression of the data was performed.

13. The information processing apparatus according to claim 12, wherein the degree of compression is a Quantization factor corresponding to the quantization processing when the data is lossy-compressed.

14. An information processing method comprising:
acquiring information corresponding to a degree of compression of lossy-compressed image data to be printed; and
determining, based on the acquired information, a providing method of a recording agent when the image data to be printed is expanded and an image based on the expanded image data is printed,
wherein the providing method is determined in the determining, in such a manner that a spatial frequency of the image in a case where the image is printed in accordance with a first providing method when the degree of compression of the image data is more than a predetermined threshold value, is higher than a spatial frequency in a case where the image is printed in accordance with a second providing method when the degree of compression of the image data is less than or equal to the predetermined threshold value.

15. The information processing method according to claim 14, wherein a number of dots corresponding to one pixel when the image is printed is determined in the determining as the providing method, and the number of dots is determined, in such a manner that the number of dots as the first providing method in the case where the degree of compression of the image data is more than the predetermined threshold value, is greater than the number of dots as the second providing method in the case where the degree of compression of the image data is less than or equal to the predetermined threshold value.

16. The information processing method according to claim 14, wherein an amount of the recording agent to be used per dot when the image is printed is determined in the determining as the providing method, and the amount of the recording agent is determined, in such a manner that the amount of the recording agent as the first providing method in the case where the degree of compression of the image data is more than the predetermined threshold value, is smaller than the amount of the recording agent as the second providing method in the case where the degree of compression of the image data is less than or equal to the predetermined threshold value.

17. The information processing method according to claim 14, wherein a number of gradation levels to be obtained when gradation conversion is performed so that the number of gradation levels of the expanded image data is reduced, is determined in the determining as the providing method, and the number of gradation levels is determined, in such a manner that the number of gradation levels as the first providing method in the case where the degree of compression of the image data is more than the predetermined threshold value, is greater than the number of gradation levels as the second providing method in the case where the degree of compression of the image data is less than or equal to the predetermined threshold value.

18. The information processing method according to claim 14, further comprising performing expansion processing for the lossy-compressed data, wherein the providing method of the recording agent when the image based on the data expanded in the performing of the expansion is printed, is determined in the determining.

19. The information processing method according to claim 18, wherein information used when the data was lossy-compressed is acquired in the acquiring as information corresponding to the degree of compression, and wherein the expansion processing is performed in the performing based on the information acquired in the acquiring, and the providing method is determined in the determining based on the information.

20. A non-transitory storage medium storing a program for causing a computer to perform the information processing method according to claim 14.

* * * * *